(12) United States Patent
Lang et al.

(10) Patent No.: US 7,500,096 B2
(45) Date of Patent: Mar. 3, 2009

(54) SYSTEM AND METHOD FOR MESSAGE FILTERING BY A TRUSTED THIRD PARTY

(75) Inventors: Christopher C. Lang, Madison, WI (US); Pavel A. Matskevich, Brooklyn, NY (US)

(73) Assignee: Pitney Bowes Inc., Stamford, CT (US)

( * ) Notice: Subject to any disclaimer, the term of this patent is extended or adjusted under 35 U.S.C. 154(b) by 763 days.

(21) Appl. No.: 10/248,260

(22) Filed: Dec. 31, 2002

(65) Prior Publication Data

US 2004/0128498 A1    Jul. 1, 2004

(51) Int. Cl.
*H04L 9/00* (2006.01)
(52) U.S. Cl. .......................................... 713/153; 726/21
(58) Field of Classification Search ................ 713/154, 713/160, 153; 726/10, 13, 21; 715/752
See application file for complete search history.

(56) References Cited

U.S. PATENT DOCUMENTS

| | | | | |
|---|---|---|---|---|
| 4,815,128 | A * | 3/1989 | Malek ......................... | 713/153 |
| 5,594,798 | A * | 1/1997 | Cox et al. .................... | 380/257 |
| 5,594,947 | A * | 1/1997 | Grube et al. ................. | 455/509 |
| 5,651,068 | A * | 7/1997 | Klemba et al. .............. | 713/159 |
| 5,966,448 | A * | 10/1999 | Namba et al. ................ | 380/33 |
| 6,072,942 | A | 6/2000 | Stockwell et al. ...... | 395/200.36 |
| 6,073,142 | A | 6/2000 | Geiger et al. ............... | 707/500 |
| 6,094,578 | A * | 7/2000 | Purcell et al. ............ | 455/426.1 |
| 6,178,505 | B1 * | 1/2001 | Schneider et al. ........... | 713/168 |
| 6,334,140 | B1 * | 12/2001 | Kawamata ................... | 709/202 |
| 6,470,447 | B1 * | 10/2002 | Lambert et al. ............. | 713/151 |
| 6,539,385 | B1 * | 3/2003 | Pollack et al. ................ | 707/10 |
| 6,560,705 | B1 * | 5/2003 | Perlman et al. ............. | 713/154 |
| 6,868,498 | B1 * | 3/2005 | Katsikas ...................... | 726/14 |
| 6,931,130 | B1 * | 8/2005 | Kraft et al. .................. | 380/258 |
| 6,947,396 | B1 * | 9/2005 | Salmi ......................... | 370/310 |
| 6,963,972 | B1 * | 11/2005 | Chang et al. ................ | 713/153 |
| 6,965,919 | B1 * | 11/2005 | Woods et al. ............... | 709/206 |
| 7,069,581 | B2 * | 6/2006 | Fu et al. ........................ | 726/3 |
| 2002/0143885 | A1 * | 10/2002 | Ross, Jr. ..................... | 709/207 |
| 2002/0169954 | A1 * | 11/2002 | Bandini et al. ............. | 713/153 |
| 2003/0041110 | A1 * | 2/2003 | Wenocur et al. ............ | 709/206 |

FOREIGN PATENT DOCUMENTS

EP    1132799 A2    9/2001

OTHER PUBLICATIONS

Pedersen, "Signature Server" Newsonik, Jan. 2001, 4 pages.

* cited by examiner

*Primary Examiner*—Christopher J Brown
(74) *Attorney, Agent, or Firm*—George M. Macdonald; Angelo N. Chaclas (57) ABSTRACT

A method and system for providing message filtering is described. In one configuration, a trusted third party system affixes an evisa to an electronic message thereby providing an indication relating to a filtering/prioritization procedure. The evisa may utilize cryptographic methods to authenticate a message and provide non-repudiation from the trusted third party.

20 Claims, 4 Drawing Sheets

SYSTEM AND METHOD FOR MESSAGE FILTERING BY A TRUSTED THIRD PARTY

BACKGROUND OF INVENTION

The illustrative embodiments described in the present application are useful in systems including those for filtering files and more particularly are useful in systems including those for filtering files using a trusted third party.

Message inspection systems have been described generally that attempt to circumvent the receipt of unwanted email advertisements known generally as spam. For example, Message Inspector 3.0 was available from Elron Software, Inc. of Burlington Mass. to filter spam messages. A reference entitled automated post office based rule analysis of e-mail messages and other data objects for controlled distribution in network environments is U.S. Pat. No. 6,073,142, issued Jun. 6, 2000 to Geiger, et al.

SUMMARY OF INVENTION

The present application describes several systems and methods for providing message filtering according to illustrative embodiments of the present application, some of which are summarized here for illustrative purposes.

In one embodiment, the present application describes a system permitting a trusted third party system or evisa (visa) device to affix an authorization indication such as an evisa to an electronic message thereby providing an indication relating to a filtering/prioritization procedure (evisa herein also referred to as E-visa and e-visa). The evisa device may utilize cryptographic methods to authenticate a message and provide non-repudiation from the Trusted Third Party. The electronic message could comprise files including text files, image files, binary files and other files. The files may be encrypted. In certain embodiments, the indication may comprise a score against a particular filter algorithm and may for instance include the text:scored PG-13 using explicit content screen number 12. Similarly, the indication may comprise a pass/fail indicator.

In another embodiment, a filtering/prioritization algorithm is automatically set or updated using the filter/prioritization settings obtained from the system of a recipient or relevant government agency. In this embodiment, the filtering/prioritization may be kept secret from the sender. In certain embodiments, the use of a Trusted Third Party allows the sender to keep their encryption keys secret from the recipient or government.

In certain embodiments, a message includes a prepaid evisa request that is processed using a value dispensing mechanism such as a postage indicia.

DETAILED DESCRIPTION

The illustrative embodiments described herein may be used in systems for functions including Defense against Denial of Service (DOS) attacks, Defense against criminal use of encryption, and Filtering (by recipient) of email. Certain embodiments could be used as an email filter even if there were no network guards in the system.

In DOS attacks, the defender is assaulted with messages from many computers (which may even belong to their own customers). Previously, there was no adequate defense against DOS attacks. The multitude of Network Guards described in certain embodiments herein serve as a distributed defense matching the distributed DOS attack. Thus a system using E-visas according to embodiments of the present application provide a defense against DOS attacks. In at least certain embodiments, every message (especially non-emails) would have to pass successively through many Network Guards before reaching its destination. The embodiments described herein are simplified for illustrative purposes. A small system may use one Network Guard, but it is expected that certain implementations will have many Network Guard systems. Preferably, the very first place a message goes as it passes through the Internet would be a Network Guard.

Certain embodiments require distributed filtering. For example, since DOS attack programs are usually executed from the hacked computers of many innocent bystanders, passing the expense for the E-visa to the senders may not solve the DOS attack problem. There, the expense might simply be incurred by innocent bystanders as might happen if an attacker hacked into an automated mailing system and reprogrammed it to spam someone with snail-mail. In this embodiment, DOS defense will preferably use filtering at a single location (such as the recipient interface). The integrity of the Internet can be increased using distributed filtering and e-visas.

Electronic data content filtering provides several censorship issues for parents, corporations and governments. Parents may wish to provide only restricted electronic message access to their children at a household boundary. Corporations may wish to restrict employee inbound and outbound access at a corporate boundary and certain governments may wish to restrict access at its borders. Content filtering may involve protecting against Viruses, Trojans and the like or may involve traditional censorship. As can be appreciated, movie ratings groups such as those that provide G, PG, PG-13, R and other ratings provide an indication of content. Similarly, certain websites may bear a seal of approval from a reputable watchdog group. However, the recipient (i.e. viewer) does not have personalized control over the criteria in the filtering/prioritization algorithm.

Email cryptography systems such as PGP (Pretty Good Privacy) exist in which the original plain text email messages are encrypted. Conventional email filtering systems typically decide whether to block or permit transfer of encrypted messages by determining if the relevant user is allowed to send or receive encrypted messages under the filter policy.

Furthermore, certain countries do not allow unfettered free speech and may wish to restrict certain materials at the electronic border of the country. While it may be difficult to prevent satellite communication with another region, a country or other entity can typically control access to at least a wired portion of a network.

The present application describes illustrative embodiments of message filtering systems that may address privacy concerns among other concerns. For example, certain law enforcement agencies such as the U.S. Federal Bureau of Investigation (FBI) have stated that governmental access to all encrypted communication is required for effective policing. Certain governments may believe that law enforcement agencies will be unable to battle crime and e-crime without the ability to monitor the content of any message that passes though their region or jurisdiction. However, legislatures such as the U.S. Congress may determine that such enfettered access to the encrypted communications of its citizens is an unacceptable violation of privacy rights. Accordingly, certain embodiments of the present application provide among other capabilities, the capability to allow the requisite monitoring activity without necessitating government access to the message and the related violation of privacy.

Similarly, corporate network administrators, ISPs or even parents may have similar content concerns regarding encrypted messages.

In one embodiment of the present application, the system provides for one or more third parties (or automated devices maintained by an appropriate organization) that a particular government or organization would trust to confirm that the passage of screened messages would not violate their laws or their policies. In this embodiment, a sender could pick which of the third parties to trust with the content of their message. Additionally, in order to manage increased levels of communication, recipients may require computationally intensive filtering/prioritization processes that may include intelligent natural language processing that is similar to the manual process that occurs in the minds of recipients. This embodiment describes a group or industry of third parties that handle such intensive personalized filtering/prioritization more centrally and more efficiently. Furthermore, the system provides for optionally requiring that the sender bear the processing costs of the system. In an alternative, a user could pay a fee or pay an additional fee in order to receive higher priority and thus hop their legitimate messages past the queues in front of slow processors and low bandwidth lines.

Value dispensing systems such as postage meters and postage systems are available from Pitney Bowes Inc. of Stamford, Conn. Postal funds are often stored in a postal security device (PSD) that may employ a secure accounting vault. For example, a reference directed toward a Network Open Metering System is described in U.S. Pat. No. 6,151,590, issued Nov. 21, 2000 and incorporated herein by reference. ClickStamp® Online is a product available from Pitney Bowes Inc. that is capable of providing a postage payment indicia in electronic form. An evisa request may be supplied with evidence of payment for the evisa submission process such as by providing an electronic indicia from a postage meter proving such payment.

The embodiments described herein may be alternatively utilized to prioritize message delivery and may also be utilized to organize messages.

Figure 1:
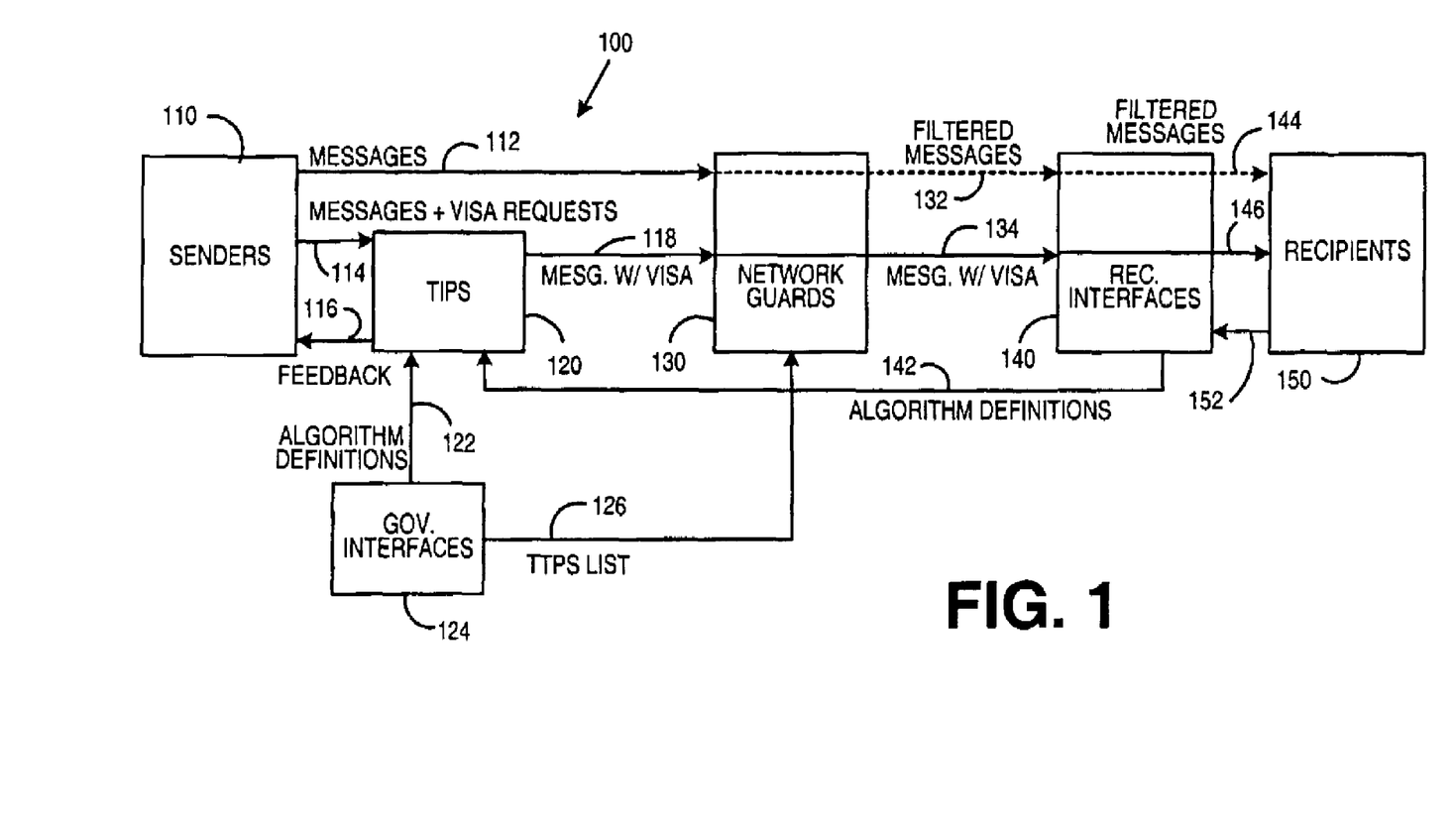
FIG. 1 is a schematic representation of a network system showing representative message paths according to an illustrative embodiment of the present application having two filter sources.

Referring to FIG. 1, a representative system block diagram having message paths is shown according to an illustrative embodiment of the present application. The systems described may be implemented using a number of different well-known processing architectures including desktop client systems available from Dell Computer Corporation and server systems available from Sun Microsystems, IBM or others. The systems may comprise networked systems including geographical and other load balancing. The communications channels depicted may include private or public systems and may include the Internet or other networks such as WANs and LANS with appropriate gateways, routers and bridges. Appropriate communications systems and protocols are employed and may include encrypted systems. The communications protocols may use the IP and SMTP (Simple Mail Transfer Protocol) protocols, but it is contemplated that many other standards and protocols for file transfer, certificate transfer and other standardized communications may be employed. Appropriate interfaces may be utilized if necessary.

The filtering algorithms described herein can be replaced with any known filtering or selection algorithm.

System 100 depicts a representative system according to an illustrative embodiment of the present application. A system according to this application could comprise many thousands of senders and recipients along with many guards and interfaces. Here, a single message path with associated systems is shown for clarity, but is not intended to represent an inclusive limiting configuration.

The system of the present embodiment comprises both government systems and recipient systems that each has filtering/prioritization demands. As described below, an alternative system may comprise a system in which demands came from only one such source.

The system 100 comprises several subsystems including recipient interfaces (RI) 140, government interfaces (GI) 124, network guards (NG) 130, and trusted third party systems (TTPS) 120. As shown in FIG. 1, a first message path shows each of messages 112 passes from a sender 110 through a network guard 130. The message then passes through the recipient interface 140. Message 132 is transferred into message 144 and then sent to the recipient 150. A message without an e-visa at step 132 is blocked, rerouted or passed along just as it is. Thus the message 132 if it passes is a non-blocked message rather than a filtered message. In an alternative, all messages that lack E-visas will be blocked/rerouted, so we will be able to erase this path altogether from the process. However, the path allows for incremental implementation since time may be required to completely set-up the E-visa system. A progressively increasing filter algorithm up to total blocking can be used.

In an alternative, the message is then transformed into a filtered message 132 and passes through the recipient interface 140. The filtered message 132 is transferred into filtered message 144 and then sent to the recipient 150.

As can be appreciated, the message may remain intact if the filters do not act upon it. Additionally, the messages 112 may be completely blocked at either the network guard or the recipient interface. The network guard 130 may utilize a rules based filter provided by the government interface 124 or may utilize some other filter/prioritization scheme. In one alternative, all messages 112 that do not include an appropriate evisa are blocked. The dotted lines of filtered messages 132 and filtered messages 144 indicate in one embodiment that some or all of the messages without an evisa may be altered or blocked.

A second message path using evisas is shown. The sender 110 sends messages that include evisa requests 114 to trusted third party system 120. The trusted third party systems 120 may give feedback 116 to the senders 110 including a confirmation message stating that the message received an evisa or information regarding what is required for the message to meet the criteria for an evisa. The feedback may include alteration suggestions. If the message 114 receives an evisa, the TTPS 120 may send the unaltered message with the visa 118 to the network guards 130 that inspect the evisa. The NG 130 may decide to pass the message with the evisa 134 to the recipient interface. The RI 140 may inspect the evisa and pass the message 146 to the recipient 150. The recipient may not receive the evisa as it may be stripped off at a previous layer. In one embodiment, the evisa service is provided free of charge. In another alternative, the sender 110 is charged for the service. In yet another alternative, the recipient is charged for the service only if the message meets the delivery criteria and is delivered. In still yet another alternative, the recipient is only charged for each message that is blocked. Other payment systems may be used.

An illustrative Trusted Third Party 120 is shown. A trusted third party system 120 may be remote to the sender such as a web server accessible using the Internet or a WAN. Alternatively, the TTPS 120 may comprise a secure web-enabled device in the possession of the sender that may include meter functionality such as the value metering functionality of a postage meter. Postage meters are available from Pitney Bowes Inc. of Stamford, Conn.

In this embodiment, each TTPS 120 preferably has an identification number. The TTPS preferably has the ability to provide authentication information and may provide a level of non-repudiation. In this embodiment, a public key/private key infrastructure with certificate authorities is used to provide authentication. Here the TTPS 120 has an ID, a private key (used to sign visas) and a database of visa types. One or more of the databases may also have a private key and/or a database of standard algorithms from which recipients and governments may choose. The database includes the algorithms and data for deciding whether a message meets the criteria for those types of visas. It also includes the public keys corresponding to the private keys of the government and recipient interfaces authorized to revise those algorithms.

Figure 4:
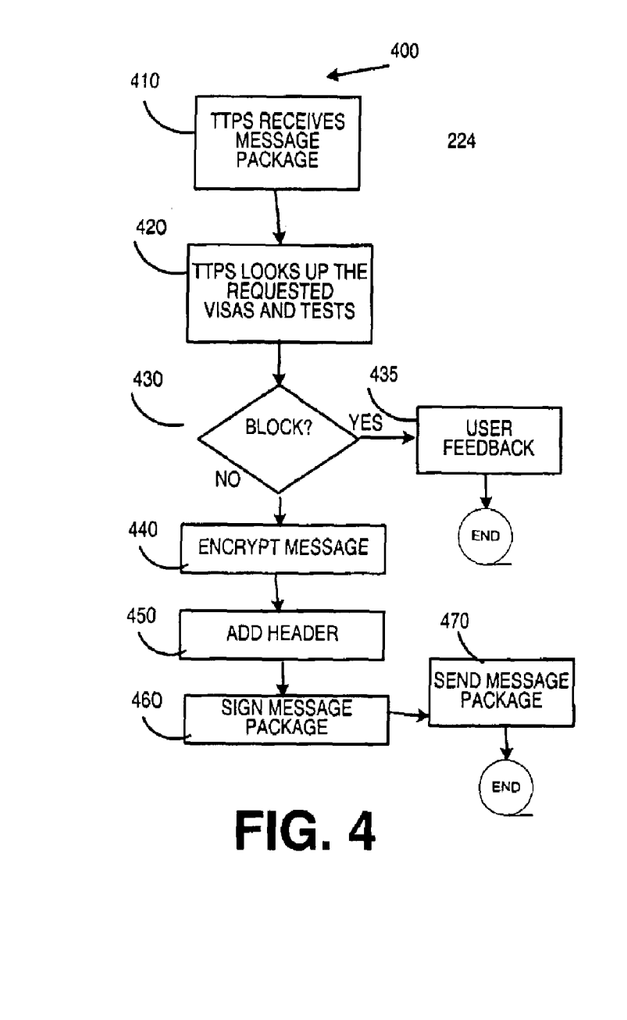
FIG. 4 is a flowchart showing an evisa determination process according to an illustrative embodiment of the present application.

Referring to FIG. 4 and FIG. 1, a process for making an evisa determination 400 is shown. In step 410, the sender 110 transmits a message 114 to a TTPS 120. If the TTPS is remote, then sending a plaintext message at step 410 would compromise security. The preferred approach is to send the message encrypted with the public key of the TTPS, so the TTPS (and only the TTPS) can convert it to plaintext. In an alternative, the message 114 is sent in plaintext, such as may be appropriate if the TTPS is a desktop device.

The message 114 also includes a list of requested visas and keys to be used for any desired encryption. This entire message packet 114 may be encrypted with the public key corresponding to the TTPS 120. Additionally, the message 114 may be digitally signed by the user 110 to provide authentication. If the TTPS 120 receives an encrypted message package 114, it decrypts the message. Additionally, the message from the sender may be authenticated. The list of requested visas may include visas for the countries or regions containing hubs through which the sender intends the message to travel.

In step 420, the TTPS 120 looks up the requested visas in its database and applies the corresponding filters and/or algorithms. Known filter and search algorithms may be utilized. In an alternative, the TTPS 120 determines which visas are required and then proceeds to make visa determinations. In another alternative, the TTPS 120 offers the sender 110 a choice of visas to apply for.

In this embodiment, for each visa, the algorithms assign the message to categories such as "block", "pass to priority level X", or "pass into mailbox X". Accordingly, the visa may indicate a particular recipient, a group of recipients or that the visa was granted on a pass/fail basis.

In step 430, the process makes a determination if the visa was denied. If so, the process proceeds to step 435 to provide feedback to the user and then ends. The feedback to the user may include a failure message, a suggestion for modification or other feedback.

If the visa is not denied or the message not blocked, the process proceeds to step 440. If the message 114 included a key or other encryption instructions such as the name of a recipient or location of a public key, the TTPS 120 encrypts the message as specified by the sender 110.

In step 450, the TTPS 120 appends the TTPS header. In this embodiment, the TTPS header includes a TTPS ID and the names and categories of the visas. The visa data may include the algorithm version such as "John Smith version 6.0 top priority visa granted by TTPS #123456".

In step 460, the TTPS 120 cryptographically signs the result of step 450. For example, the TTPS 130 appends an encrypted hash of the result of 450 using the private key of the TTPS 120.

In step 470, the TTPS 120 sends the result of step 460 to the recipient 150. In this embodiment, the TTPS 120 sends the message to recipient 150 by way of a path including inspectors such as the NG 130 and RI 140. In an alternative, the TTPS 120 sends the message directly to the recipient 150.

Referring to FIG. 1, inspector systems are shown. The inspectors could be local to a LAN or WAN and may apply rules set by a corporate or other entity. In this embodiment, for example, a Network Guard 130 is shown. In this embodiment, Network guards 130 each contain a database of the currently valid visas of the country or region for which it is inspecting messages. The network guard 130 database includes the names and version numbers of each visa along with a list of the IDs and public keys of the TTPSs 120 authorized to issue those visas. The network guard 130 database also contains the public keys corresponding to the private keys held by the government interfaces authorized to revise that database. In an alternative, the network guard 130 has the ability to obtain the necessary visa and TTPS information as well as information regarding the visa message rule system clients such as the government interfaces.

Figure 5:
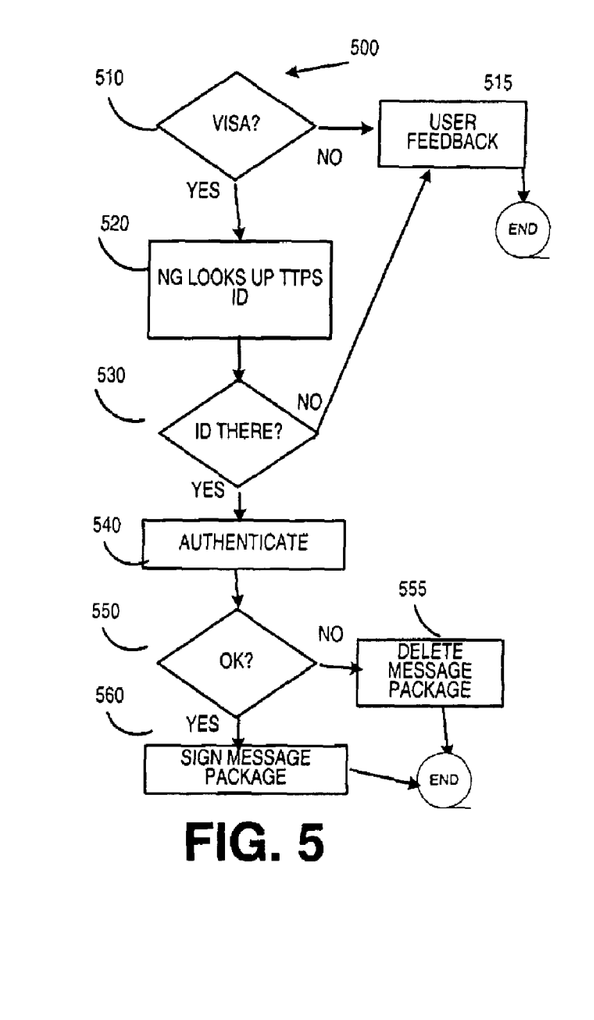
FIG. 5 is a flowchart showing a network filter determination process according to an illustrative embodiment of the present application.

With Reference to FIG. 1 and FIG. 5, a process for inspecting messages is described with reference to the network guard 130. As can be appreciated, other inspectors may be utilized. The inspection process 500 begins in step 505 when a message is received. In step 510, the network guard 130 determines whether the incoming message has a valid visa type such as a visa of the current version. If the message does not have a valid visa type, the process proceeds to step 515 and returns the message to the sender. In an alternative, the NG 130 forwards the message to a TTPS 120 for processing such as by sending the message to a free TTPS 120 so that the sender 110 is not charged for the service.

In step 520, the NG 130 obtains the ID of the TTPS 120 that issued the visa in its database. In step 530, the process determines if the ID is in the database. If not, it returns the message to sender 110 as in step 515. Similarly, in an alternative, the message could be re-routed to another TTPS.

In step 540, the NG 130 authenticates the visa. For example, the NG 130 may use the public key found in its database to authenticate the visa. The NG 130 may decrypt the hash and check that it matches the hash of the message computed by NG 130 with the TTPS ID and the names and categories of the visas. Other known authentication and non-repudiation techniques may be utilized.

In step 550, if the NG 130 determines that the visa is not authentic, it deletes the message. In an alternative, the NG 130 may quarantine all messages from that sender or otherwise take remedial action. If the visa is found to be authentic, the NG 130 sends it to the recipient 150. As can be appreciated, other inspectors, routers, bridges or hubs may be utilized such as RI 140. In an alternative, the NG 130 may apply a screen to the message. While the file message payload may be encrypted, there may still be a reason to screen for a particular match.

With reference to FIG. 1, a rule promulgator entity is described according to an illustrative embodiment of the present application. As can be appreciated, the Trusted Third Party Systems 120 receive rules to be applied. While the rule promulgator could test for the rules, such access to the message payload may be an unacceptable invasion of privacy. Accordingly, the governmental agency, parent or company creates a set of rules or algorithms that must be complied with for an entry visa. Of course the TTPS system could facilitate such rule generation and may even provide standard rule sets or ratings that rule promulgators may choose to utilize or modify.

In this illustrative embodiment, the rule promulgator is a government interface (GI) 124. In this embodiment, a private key/public key infrastructure is utilized for authentication and encryption. As can be appreciated, other known security and authentication/non-repudiation techniques may be utilized including a one-time pad. Each government interface 124 stores or has access to a private key that it uses to authenticate itself to the NGs 130 and TTPSs 120. The Gis 124 also store copies of the algorithms that define the current visas it issued, and lists of its NGs 130 and TTPS 120 and their keys. Whenever a government extends trust to a new TTPS or revokes trust from an existing TTPS, the GI sends a signed encrypted message to all NGs 130 on its list. That message instructs them to accordingly update their databases of TTPSs using the TTPS List 126. As can be appreciated, the list of visas can be used to ensure that only currently authorized TTPSs 120 participate in the system. The GI 124 also sends new TTPSs signed encrypted copies of the algorithms 122 and names of the current visas. As new laws are passed by the relevant governmental entity and/or algorithms for enforcing those laws become available, they may be entered into the GI 124. The GI 124 will automatically send the new algorithms to all the TTPSs on its list along with a new visa version number and send the new visa version number to all the NGs on its list. As can be appreciated, a company or household can similarly enforce policies using a rule promulgator. The list of visas may each have a separate cost associated with them and the TTPS systems 120 may be charged with collecting the tax or toll from the senders 110.

In an alternative, the system may be configured to enable a free Internet that does not impose visa costs. In such an embodiment, a government may fund the TTPS or alternative government TTPS system may be operated in which slightly less privacy may be provided. In such situations, a sender 110 may not be willing to wait in a queue of other senders 110 seeking the free service or may wish to keep their plaintext messages away from any government access. Accordingly, a user may be presented to a private TTPS to issue their visa for a fee.

With reference to FIG. 1, an inspector is shown as recipient interface 140. A recipient interface (RI) 140 may also require a visa in order to accept a message. In an alternative, the recipient interface has the capability of decrypting all messages in order to provide an independent filter/review of the message. For example, a company may wish to send encrypted messages through the Internet, but may wish to have clear text before presenting the messages to the employee or from the employee. In such a situation, the recipient interface actually has access to the keys used to decrypt the messages.

In the present embodiment, each recipient interface 140 has access to a private key that may be used to authenticate itself to TTPSs 120. The RI 140 has access to copies of the rules/algorithms used by the TTPSs 120 and to a database of TTPS and their keys as do the NGs 130. Each RI 140 also includes a system for locally running additional algorithms such as algorithms that may be the same or simpler than the TTPS algorithms including accepting messages from designated senders. The items may be accessed from a RI 140 database.

In the present embodiment, whenever a recipient extends trust to a new TTPS 120 or revokes trust from an existing TTPS 120, the RI 140 updates its database. The RI 140 also sends signed encrypted copies of the current algorithms to any new TTPSs shown in path 142. The recipient interface 140 operates as a sort of programming language with which the recipient defines the algorithms for filtering/prioritization of incoming messages. These algorithms are automatically signed (and potentially encrypted) and sent to all the TTPSs 120 in its database along with new visa version numbers.

Figure 2:
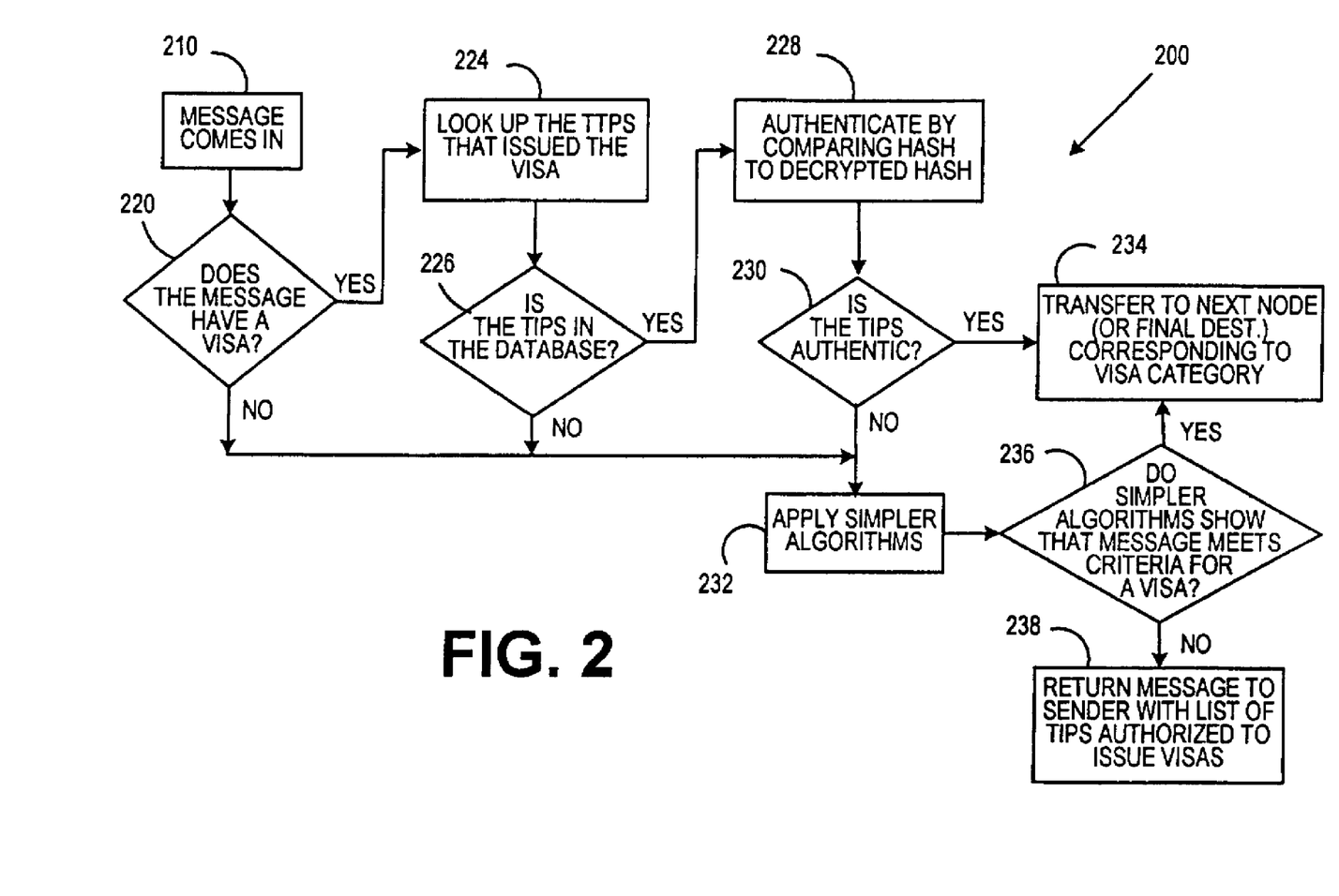
FIG. 2 is a flowchart showing a message processing procedure according to an illustrative embodiment of the present application.

Referring to FIG. 1 and FIG. 2, the RI 140 may utilize process 200 for incoming messages according to another illustrative embodiment of the present invention. In this embodiment, for example, the algorithm used is a virus scanner. In this example, the sender 110, Sally wishes to send an encrypted message to the recipient, Ralph. Ralph resides in Telopotamia, so Sally's message must pass through web servers in that country. The Telopotamian government has set up network guards to filter web viruses out of all web traffic with in its borders. Since this is the first time Sally has ever sent a message through Telopotamia, she does not apply for a visa. The network guards intercept her message and automatically forward it to a TTPS funded by the Telopotamian government. That TTPS runs an algorithm that first looks at the header of Sally's message to see if it is encrypted and, if so, rejects it. Since Sally's message is encrypted, it sends the message back to Sally informing her that she needs a visa to send messages through Telopotamia and that her request for a visa was denied because of the encryption. It also sends her a list of TTPSs authorized to issue the needed visa. Since Sally does not want his message to be seen by the Telopotamian government, she sends it to a different TTPS, called Generic Visa Service, with whom Sally establishes an account.

This time, instead of encrypting it with Ralph's public key, Sally simply appends Ralph's key and encrypts the result with the public key for the Generic TTPS. In order for Sally to send an encrypted message to Ralph, Sally has to instruct the TTPS to encrypt the filtered message with Ralph's public key, who upon receipt could decrypt and read the message using his private key. The TTPS has an encryption contract to fulfill, and it's up to Sally to indicate what encryption to perform (if any). The TTPS may not have Ralph's public key in the database, so it's provided for TTPS.

The Generic TTPS receives Sally's message and decrypts it with its private key. It then runs the algorithm specified by the Telopotamian government, which began, as before, with checking to see whether the message is encrypted. This time it is not encrypted, so it continues with the next step: running the message through the latest version of Norton Anti-Virus®. This indicates that the message contains no known viruses, so the Generic TTPS encrypts the message with Ralph's public key, appends the string "Telopotamian version 3.25.04.4 anti-virus visa granted by TTPS #654321", and then appends a signed hash of the result (i.e. signed with its private key). The Generic TTPS then sends copies of this to both Ralph and Sally. As before, network guards intercept the message sent to Ralph. This time, each network guard sees that a visa has been attached. It finds the public key corresponding to TTPS #654321 in its database, uses this to decrypt the hash and compares the decrypted hash to a hash of the rest of the message. Since the two match, it relays the message it received. The message similarly passes through several other network guards and eventually reaches the destination or is rejected along the way.

In an alternative, Sally could sign her plaintext message before sending it to the TTPS so that it could not be changed without being detected.

In another illustrative example, the process 200 begins at step 210 when a message comes in to the inspector. In step 220, the process 200 determines whether the message has a visa. If not, the TTPS determines whether it can apply simpler algorithms in step 232. In step 236, the TTPS decides whether the visa test passes. If not, the message is returned in step 238. If the visa is still applicable, the process then sends the message on its way in step 234. In step 234, the file or packet may be transferred to the next node in the network path or a final destination. For example, in one transfer, the file would be transferred to a mailbox.

In step 220, if the message does have a visa and the process proceeds to step 224 to look up the TTPS that issued the visa. In step 226, the process determines if the TTPS is listed in its database. If so, the process proceeds to step 228 to authenticate the visa. If the visa is authenticated in step 230, the message is sent on its way in step 234. If the visa is not authenticated, the message is still processed from step 232 on as discussed above. In step 226, if the TTPS is not in the database, the message is also passed to step 232 for processing as discussed above.

Figure 3:
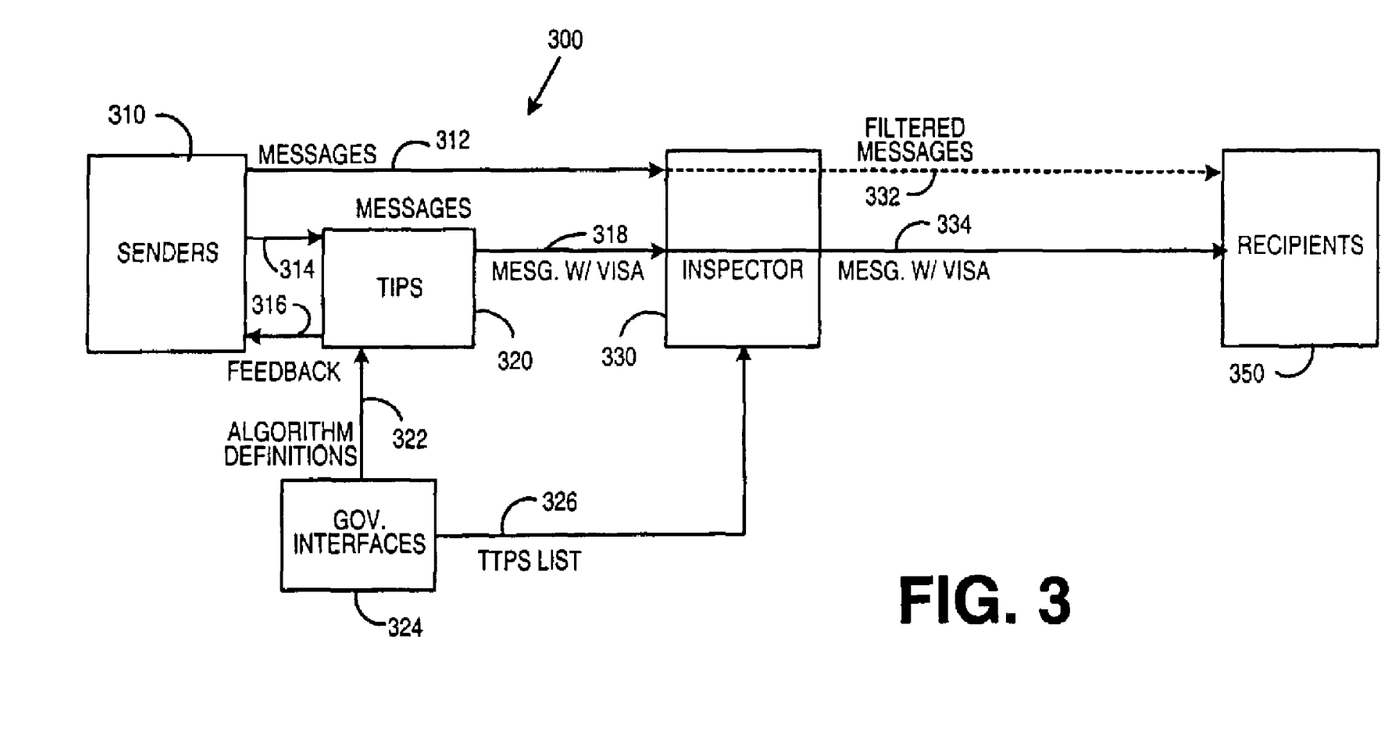
FIG. 3 is a schematic representation of a network system showing representative message paths according to another illustrative embodiment of the present application having one filter source.

Referring to FIG. 3, another illustrative embodiment is described having system 300 to process messages. Here, the senders 310 send messages 312 or other messages to a TTPS 314. The TTPS 320 then determines a route for the message and determines which visas would be required. The TTPS 320 then test for those visas and charges the account of the sender 320. The TTPS 320 then sends the messages with the visa 318 to the inspector 330. In an alternative, feedback 316 can be sent to the sender 310 to inform the sender 310 of the route, cost, visas and other information. In another alternative, the feedback could include a choice of routes or visa information and an authorization request for payment.

Here, the government interface 324 sends algorithm definitions and data to the TTPS 320 and sends a TTPS list 326 to the inspector 330. The message with visa 334 that passes through the inspector 330 is sent to the recipient 350. Here, as above, messages outside of the system 312 pass through the inspector if they pass the filter as filtered messages 332 and are sent on to the recipient.

As can be appreciated, the senders need not know the exact visa required in order for the system to process the message. A sender may use some proxy for the visas that is easy to understand. Additionally, the required visas could be stored in a lookup table. The user may be provided a selection of visas to choose from. Of course, a third party such as the TTPS could provide a list of required visas.

In an alternative applicable to any embodiment herein, a DOS defense is described. Each TTPS is set to filter out the kinds of packets used in DOS attacks. For example, garbage and white noise packets can be filtered. To detect and catch unusual packets, each TTPS maintains a log of messages processed over a previous period of time, for example the last few minutes. If the TTPS sees the same packet (or packet from a suspect group) being sent to the same recipient at an unusually high frequency (which could be set as low such as twice a minute) it flags a potential DOS packet. The TTPS then filters out the DOS packet. The TTPS optionally sends a warning to the sender informing the sender that they have likely been participating in a DOS attack and that its packets were dropped and message deleted. In another alternative, the TTPS may receive feedback from NGs, Ris or others regarding suspect packets to screen for.

In another alternative embodiment, an implementation for national virus protection is described. The system of this embodiment is implemented with GIs and NGs as above to protect a nation (or other region) from the transmission of known computer viruses and other malicious files. The algorithm for getting a visa involves going through a virus scanner much like commercially available signature scanners such as the product known as Norton Anti-Virus® which may compare the message to known viruses or other known hazards or suspicious activity. This particular algorithm issues a "passing" visa to messages that pass the scan, and rejects those that do not. The result is virus scanning at a regional level, yet people are able to send encrypted messages without sharing their keys with the government of that region.

In another alternative, the message load is exercised to determine if one or more unacceptable behaviors are exhibited. For example, the TTPS may utilize a virtual PC to launch an image browser to view a file. If the browser is manipulated into performing an illegal action such as writing a file, the image file is tagged as having a virus and is quarantined.

In another alternative embodiment, "fuzzy cases" are handled in which a message is determined to be suspicious but it is computationally difficult to determine that it is malicious. For example, a message that contains a high density of words like "bomb", "kill you", "breast" and "f*ck", may be dealt with in this way to filter for pornography, extortion and other objectionable content. In this embodiment, the TTPS 120 grants the visa, but also sends a copy of the decrypted message to a government agency. In a further alternative, TTPS 120 may also send notification to the sender 110. At least one advantage of the system described here is that it allows senders to send encrypted messages and avoid government access to messages that are not suspicious.

In another embodiment, a TTPS 120 or other party establishes the sender 110 as a trusted sender. The sender 110 may present physical identification or other authenticating information to obtain a certificate or key to be used for authentication purposes. In one embodiment, a key token such as a Dallas Semiconductor iButton® are issued to senders for use in authentication and non-repudiation.

In yet another alternative, a TIPS 120 may encourage recipients to use TTPSs by offering proprietary filter/prioritization algorithms that the recipients cannot run on their own. One kind of such algorithm that would require less artificial intelligence than some algorithms is one that uses forms. For example, a company that maintains the TTPS would develop message forms. For example, a standard form for each common kind of transaction message with fields such as "party names", "party signature", "what is being exchanged". The sender would compose their message using these forms, and thus would reduce the variety of possible messages. Accordingly, the TTPS may more easily determine that the message deserves a visa. In one embodiment, the TTPS offers a discount for messages composed using the forms.

In still yet another alternative, TTPS systems may offer credit or debit accounts to senders. If so, the sender could set a limit on the amount of money charged in a given billing period.

In an alternative applicable to any of the embodiments, wireless communications may be utilized. One or more of the available cellular telephone communications channels may be utilized and satellite communications systems such as GPS receivers and other satellite systems may be utilized. For example, a Bluetooth TM Personal Area Network may be utilized or an 802.11 wireless system or access point may be used.

In an alternative applicable to any embodiment described herein, a sender 110 may maintain an account with TTPS 120 or a third party to pay for the visa qualification system service. In a further such embodiment, the sender may prepay for the service by debiting a vault such as those used in postage meter machines. The indicia evidencing payment may be electronically attached to the visa request.

Furthermore, differing types of processors and logic systems may be supported. For example, JAVA based PALM OS devices may be utilized. The processors described may be co-located with or performed by routers or devices including those available from Cisco Systems, Inc. and may be implemented at different levels of a network architecture such as the transport layer, physical layer, application layer or other layer.

In another alternative applicable to any of the embodiments, the indicia creating device includes a token controller having a secure token key storage such as an iButton® available from Dallas Semiconductor. If such a device is subject to an attack, for example, a physical attack on the device, the key information is erased. Digital signatures may be generated as part of an indicia. Passwords may be used, such as a password to access the device. In an alternative, the password may include biometric data read from a user. Alternatively, other secret key or public key systems may be utilized. Many key exchange mechanisms could be utilized included a Key Encryption Key. Additionally, authentication and repudiation systems such as a secure hash including SHA-1 could be utilized and encryption utilizing a private key for decryption by public key for authentication.

In an alternative applicable to any of the embodiments described above, well-known filtering methods may be employed. Additionally, the filtering algorithms may be simple. They may identify items with unacceptable words using a string search. The dictionary of excluded words may also include known intentional misspellings. Similarly, unacceptable file types may be identified. Additionally, a more complex algorithm could be used that identifies viruses and spam. Sophisticated algorithms also check the attachments to a document. Similarly, many binary file formats must be decoded for review. In an alternative, the message explicitly identifies the type of file attached, for example, a Word 6.0 document in big endian format. In another alternative, a human review access the file as appropriate and makes a visa determination. The file is then processed through the system as described above. Additionally, algorithms are known to detect steganography and can identify hidden information in image files. One method of doing this is by inspecting the correlations in the least significant bits of the image pixels.

In an alternative applicable to any embodiment herein, various signing algorithms may be used. For example any one of or group of signing algorithms including RSA and DSA may be utilized. The metadata and the message are hashed using SHA-1. If RSA is used, the hash is padded and encrypted with the private key following the x9.31 standard or using the PKCS-1 standard. If DSA is utilized, the hash is combined with a private key as described in FIPS 186-2 standard, the standards being incorporated herein by reference.

The present application describes illustrative embodiments of a system and method for filtering messages. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for filtering messages using a computer comprising:
  receiving an incoming message intended for a recipient at the computer along a message path through physical geographic regions to the recipient;
  determining at least one filter algorithm to apply to the message by using the message path through physical geographic regions to the recipient in order to determine a required visa type, wherein the required visa type is associated with the at least one filter algorithm;
  applying the at least one filter algorithm to the message;
  generating an authenticated visa for the message path through physical geographic regions according to the at least one filter algorithm that may be used to identify the at least one filter algorithm that has been applied to the message and
  sending the message and the authenticated visa downstream from the computer along the message path, wherein the message path downstream from the computer includes a public network.

2. The method of claim 1 wherein:
  the incoming message comprises at least one explicit visa request selected from at least two available visas including an indicator identifying the requested visa.

3. The method of claim 2 wherein:
  the message and an explicit visa are sent as a message package, wherein the explicit visa comprises at least one identifying character and is not inferred from a message format; and
  wherein the filtering algorithm includes scanning for objectionable words.

4. The method of claim 3 further comprising:
  receiving encryption instructions; and
  encrypting the message according to the encryption instructions.

5. The method of claim 3 further comprising:
  receiving encryption instructions; and
  encrypting the message package according to the encryption instructions.

6. The method of claim 1 further comprising:
  determining the algorithm according to an explicit visa request received from a user in a secured incoming message sent through a public network, wherein the computer includes a trusted third party server.

7. The method of claim 6 wherein:
the incoming message is received separately from the visa request.

8. The method of claim 1 further comprising:
determining the at least one filter algorithm according to a routing determination.

9. The method of claim 8 further comprising:
receiving the incoming message from a user; and
prompting the user for a routing determination.

10. The method of claim 1 further comprising:
blocking messages that lack visas.

11. The method of claim 1 further comprising:
rerouting messages that lack visas.

12. The method of claim 1 further comprising:
expediting messages that pass a visa algorithm.

13. The method of claim 1 further comprising:
receiving updated visa algorithms from a governmental entity.

14. The method of claim 1 further comprising:
providing visa authorization authentication information and wherein the visa includes a visa version identifier.

15. The method of claim 1 wherein:
the recipient country location is used to determine a required visa type associated with the at least one filter algorithm.

16. The method of claim 1 further comprising:
receiving the incoming message in encrypted form;
decrypting the incoming message;
obtaining a public key associated with the recipient;
after applying the at least one filter algorithm to the message, re-encrypting the message using the recipient public key;
attaching the visa to the message; and
sending the re-encrypted message and visa along the message path toward the recipient.

17. The method of claim 1 further comprising:
modifying the message in accordance with the filter algorithm;
attaching the visa to the modified message; and
sending the modified message and visa along the message path toward the recipient.

18. A method for filtering messages using a trusted third party computer comprising:
receiving an incoming message intended for a recipient at the trusted third party computer along a message path through physical geographic regions to the recipient;
determining at least one filter algorithm to apply to the message using the message path through physical geographic regions to the recipient and rules provided by a governmental entity that does not operate the trusted third party computer;
applying the at least one filter algorithm to the message;
generating a cryptographically authenticated visa according to the at least one filter algorithm;
attaching the visa to the message; and
sending the message with attached visa downstream along the message path toward the recipient including through a public network.

19. The method of claim 1 further comprising:
decrypting the incoming message;
determining if the message is further encrypted; and
canceling processing if the message is further encrypted.

20. The method of claim 1 further comprising:
charging a user for processing the incoming message including generating an authenticated visa.

\* \* \* \* \*